(12) United States Patent
Anderson

(10) Patent No.: US 12,379,850 B2
(45) Date of Patent: Aug. 5, 2025

(54) MEMORY CONTROLLER WITH COMMAND REORDERING

(71) Applicant: TEXAS INSTRUMENTS INCORPORATED, Dallas, TX (US)

(72) Inventor: Timothy D. Anderson, University Park, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 8 days.

(21) Appl. No.: 18/361,159

(22) Filed: Jul. 28, 2023

(65) Prior Publication Data
US 2024/0036736 A1 Feb. 1, 2024

Related U.S. Application Data

(60) Provisional application No. 63/393,280, filed on Jul. 29, 2022.

(51) Int. Cl.
*G06F 3/06* (2006.01)
(52) U.S. Cl.
CPC .......... *G06F 3/0613* (2013.01); *G06F 3/0659* (2013.01); *G06F 3/0673* (2013.01)
(58) Field of Classification Search
CPC .... G06F 3/0613; G06F 3/0659; G06F 3/0673; G06F 13/1626
See application file for complete search history.

(56) References Cited

U.S. PATENT DOCUMENTS

| | | | |
|---|---|---|---|
| 10,241,941 | B2 | 3/2019 | Fader et al. |
| 2005/0021921 | A1* | 1/2005 | Blackmon ........... G06F 13/1631 711/158 |
| 2018/0165229 | A1* | 6/2018 | Chhabra ............. G06F 13/1626 |
| 2018/0329839 | A1 | 11/2018 | Durbhakula |
| 2020/0065028 | A1 | 2/2020 | Keil et al. |

FOREIGN PATENT DOCUMENTS

| | | | |
|---|---|---|---|
| KR | 101154708 | B1 | 6/2012 |
| KR | 101182018 | B1 | 9/2012 |

OTHER PUBLICATIONS

International Search Report in corresponding PCT Patent Application No. PCT/2023/071305, mailed Nov. 13, 2023 (3 pages).
Machine Translation for 101154708KR.
Machine Translation for 101182018KR.

\* cited by examiner

*Primary Examiner* — Aracelis Ruiz
(74) *Attorney, Agent, or Firm* — Xianghui Huang; Frank D. Cimino

(57) ABSTRACT

A system for handling requests that includes a set of memory banks coupled to a memory controller which comprises a set of read queues, including a read queue currently designated as the priority read queue. The memory controller loads read requests from an associated processor into the set of read queues. To process the read requests, the memory controller is configured to schedule the read requests of the priority read queue based on an availability of the associated memory bank, and if not in the priority read queue, also based on whether the read requests conflict with a recently scheduled read request from the priority read queue. Upon an execution of a read request from the priority read queue, the memory controller designates a different one of the set of read queues as the priority read queue, if the read request was at a front of the priority read queue.

20 Claims, 10 Drawing Sheets

MEMORY CONTROLLER WITH COMMAND REORDERING

RELATED APPLICATIONS

This application is related to, and claims the benefit of priority to, U.S. Provisional Application No. 63/393,280, filed on Jul. 29, 2022, which is hereby incorporated by reference in its entirety.

TECHNICAL FIELD

Aspects of the disclosure are related to the field of computing hardware, and in particular, to memory controllers in computing devices.

BACKGROUND

In machine learning applications, a common operation requires having two sources read from memory, and a third source write results to memory. In addition, there is often a direct memory access (DMA) controller which also moves data to or from the memory pool.

Because multi-port static random-access memory (SRAM) arrays are very expensive, most memory designs that need to service multiple requests in parallel—and which have a reasonable amount of storage—employ an array of single-port SRAM banks which are individually addressable. In such examples, a memory controller may allow one requestor to access a first bank, while a second requestor accesses a second bank at the same time. However, performance issues arise when two requestors need to access the same bank at the same time. For example, one approach is to allow one requestor to perform the access to a given bank, and any other requestors attempting to access the same bank will be "stalled," and will not be allowed to proceed until the bank is available.

Furthermore, many machine learning access patterns look like streams of addresses with a constant offset for each source. When these offsets match the distance in address space which results in coming back to the same bank, patterns arise that perform very poorly, with up to 300% or more performance overhead. To mitigate this, software can add "pad" or wasted memory space around the information, but this reduces the effective amount of on-chip SRAM.

An additional problem with address patterns in which back-to-back requests end up mapping to the same bank occurs when using SRAM banks which can only accept one access every other cycle. Such SRAMs are desirable because they generally are smaller in terms of physical area, and generally consume lower power per access than RAMs that can meet single cycle access rates, although they have slower access speeds.

SUMMARY

Technology disclosed herein includes a memory controller capable of reordering read and/or write requests based on the availability of memory banks to improve the speed and efficiency of data transfers. In various implementations, a memory controller includes a set of read queues and control circuitry. The read queues store read requests, while the control circuitry governs the order in which the read requests are processed.

In one example implementation, the memory controller is coupled to a set of memory banks and one or more processors. The memory controller loads read requests from the one or more processors into the set of read queues. To schedule the read requests, the memory controller, for each read request, schedules the read request based on an availability of the associated memory bank and, if the read request is in a read queue that is not currently designated as a priority read queue, also based on whether the read request conflicts with a recently scheduled read request from the priority read queue. If the recently scheduled read request of the priority read queue is at a front of the queue, the memory controller designates a different read queue of the set of read queues as the new priority read queue.

In an embodiment, the memory controller examines the availability of the front read request in a queue first. If the front read request is unavailable, the memory controller refrains from scheduling the front read request and move to a next read request in the queue. The memory controller continues this process until it can successfully schedule a read request.

In another example implementation the memory controller includes write queues for storing write requests generated by the one or more processors. The memory controller receives write requests from the processors and stores the write requests within the write queues. To process the write requests, the memory controller, for each write request, schedules the write request based on availability of the associated memory bank. If the associated memory bank is not available, the memory controller refrains from scheduling the write request and moves to a next write request in the queue. Alternatively, if the associated memory bank is available, the memory controller will schedule the write request to be executed.

This Summary is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Figure 1:
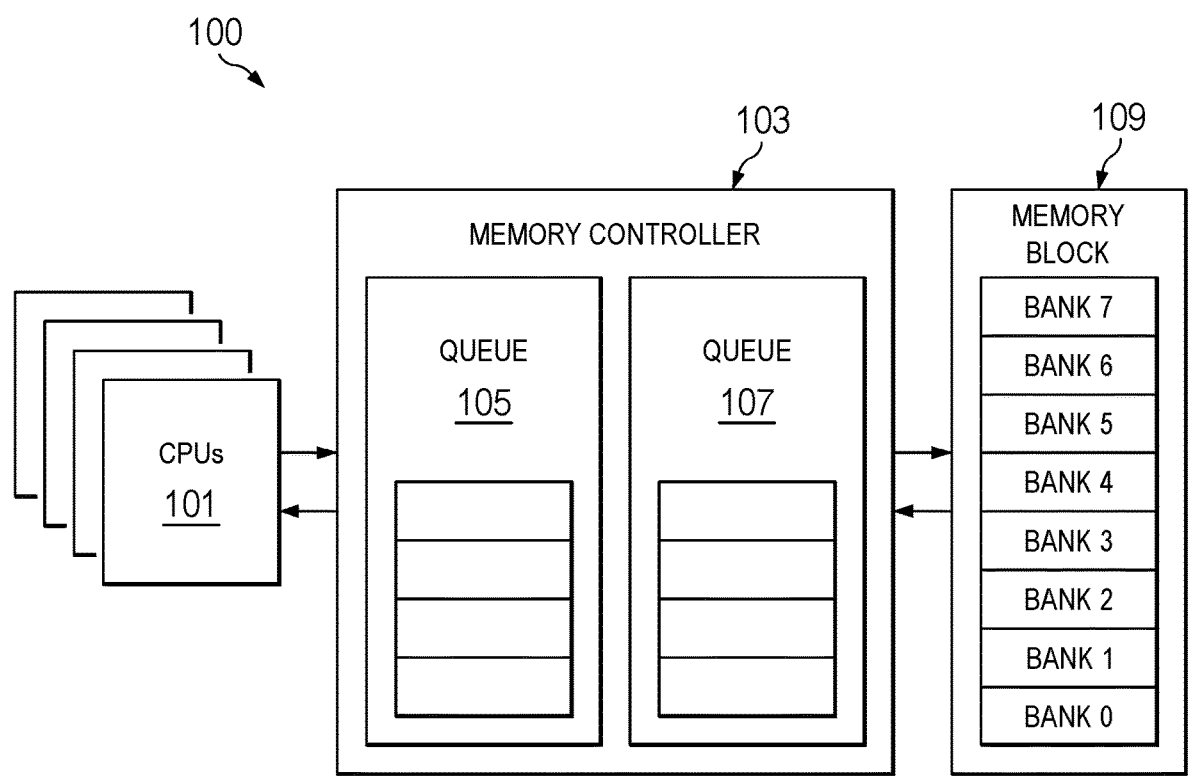
FIG. 1 illustrates a computing environment having a memory controller in an implementation.

Improvements to memory controllers are disclosed herein that improve performance and reduce power consumption, among other advantages. In various implementations, a memory controller includes control circuitry and multiple read and write queues. In a scenario focusing on read operations for illustrative purposes, the control circuitry of the memory controller loads read requests into the read queues and schedules each of them for execution based on an availability of an associated memory bank, as well whether a given read request is in a queue currently designated as a priority read queue. The queue that is designated as the priority read queue changes when the front-most read request is executed from the current priority read queue.

The following considers an example of a read request in a non-priority read queue. The control circuitry determines for that read request whether the memory bank associated with the read request is available. The memory bank associated with the read request is considered available if sufficient cycles have elapsed since the last time data was read from the memory bank. If the associated memory bank has had sufficient time to "cool down," then it is considered available. Conversely, it is considered unavailable.

If the associated memory bank is determined to be unavailable, then the control circuitry moves to the next read request in the current non-priority read queue so that the process starts over for the next read request (e.g., the control circuitry determines whether its associated memory bank is available, etc.). However, if the associated memory bank for the current read request is determined to be available, then the controller proceeds to determine whether the read request conflicts with a recently scheduled read request from a different one of the queues that is currently designated as the priority queue. A conflict exists when the memory bank associated with the recently scheduled read request from the priority read queue is the same as the memory bank associated with the current read request in the non-priority read queue. Thus, while the target memory bank may be in an available state, it will soon be in an unavailable state since the recently scheduled read request will soon be executed. If no conflict exists, then the control circuitry proceeds to schedule the current read request for execution. If a conflict does exist with the recently scheduled read request, then the control circuitry moves to the next read request in the queue and repeats the analysis described above.

The control circuitry changes the designation of the priority read queue when a read request at the front of the priority read queue is scheduled. Thus, upon an execution of the recently scheduled read request discussed immediately above, the control circuitry changes the priority designation to a different one of the queues if the recently-schedule read request had been at a front of its queue. Else, the priority designation remains the same until a read request at the front of the priority queue has been scheduled. The designation may be changed in a round-robin manner. For instance, in a case where there are only two read queues, the priority designation would switch between them. However, in a case where there are three or more read queues, the priority designation may change from one to another, in a cyclical manner. Other techniques for changing the priority designation are possible and may be considered in the scope of the present disclosure, such as random (or pseudo random) designations.

The following considers an example of a current read request in a queue that is currently designated as the priority read queue. The control circuitry determines for that read request whether the memory bank associated with the read request is available. As mentioned, the memory bank associated with the read request is considered available if sufficient cycles have elapsed since the last time data was read from and/or written to the associated memory bank. If the associated memory bank of the current read request is determined to be unavailable, then the control circuitry moves to the next read request in the current queue and the process starts over (e.g., the control circuitry determines the availability of the associated memory bank). In other words, if the associated memory bank is unavailable, the control circuitry moves to the next read request in the priority read queue and repeats this process until it can identify a read request in the priority queue with an available memory bank. However, if the associated memory bank of the current read request is determined to be available, then the control circuitry proceeds to schedule the read request since it will not conflict with a recently scheduled read request from the same queue.

As mentioned, the control circuitry changes the designation of the priority read queue when a read request at the front of the priority read queue is scheduled. Thus, if the current read request was at the front of the current queue, and since the current queue is assumed here to be the priority queue, the control circuitry switches the designation of the priority queue to a different one of the multiple queues. In either case, the control circuitry proceeds to a next read request in a different one of the multiple read queues.

In another aspect of the technology disclosed herein, a modified mapping of addresses to memory banks is disclosed that that reduces the likelihood of back-to-back accesses to the same bank for an access sequence of addresses which increment by a constant offset. The modified mapping resolves one of the issues of the problematic offsets encountered by prior art, including allowing designs to use the two-cycle access SRAMs which are denser and lower power by comparison.

An internal memory circuit—or "mem" block—is also disclosed that has a specific number of read and write ports. Each port can have an access serviced every cycle. An arbitration network for all requestors routes each requestor to a specific read or write port. If a requestor is capable of producing both read and write requests, the read and write traffic will be separated and sent to different ports on the mem block.

Finally, command queues are disclosed for each read port that holds multiple commands. In various embodiments, the queues hold eight commands for each read port. A "preferred" read port is chosen based on a round-robin style selector. Commands on the preferred port take priority, commands on the non-preferred port are scanned to find transactions which do not conflict with the preferred port.

Write ports are also disclosed and are serviced in order from the write port queue. However, the writes may be dequeued into write nodes. There are more write nodes than write ports in the design to allow multiple writes from the same port to commit at the same time—this allows a write port to "catch up" when writes are delayed due to conflicts. When the writes are in the write node, they are ready to be scheduled to perform the bank access. Writes may be dequeued from the write node if there is no read port which needs access to the same bank. If a write port cannot move a transaction to a write node because that write node is full, then the write node's write will take priority over the reads.

Turning now to the Figures, FIG. 1 illustrates computing environment 100 in an implementation. Computing environment 100 includes CPUs 101, memory controller 103, and memory block 109. CPUs 101 are representative processing resources (e.g., processor cores and/or groups thereof with or without supporting circuitry) which require access to memory to perform an associated function. For example, CPUs 101 may be representative of a system that employs a neural network to perform a task (e.g., object detection, image classification, etc.).

CPUs 101 generate read requests to be handled by memory controller 103. Memory controller 103 is coupled to memory block 109 to handle the read requests. In an implementation CPUs 101 include streaming engines which provide read requests to memory controller 103. Memory controller 103 comprises a command queue for each streaming engine of CPUs 101. In operation, the streaming engines of CPUs 101 provide read requests to a respective command queue of memory controller 103. In response, memory controller 103 examines the read requests of the command queues to determine which read requests to execute.

Memory controller 103 is representative of a controller configured to schedule and execute read requests based on an availability of the read requests. Memory controller 103 may be implemented in a larger context to serve as an on-chip mechanism for handling read requests, later discussed with reference to FIG. 3. Memory controller 103 is coupled to memory block 109 and includes, but is not limited to, command queue 105 and command queue 107. Memory block 109 is representative of a memory element that comprises multiple memory banks. Memory block 109 has been illustrated to include a total of eight memory banks in an example, although more banks or fewer banks are possible.

In an implementation, memory controller 103 includes circuitry configured to designate priority among the command queues. The priority designation signifies to memory controller 103 which command queue is representative of the priority command queue. More specifically, the priority designation indicates to memory controller 103 which command queue to examine first during an execution cycle. For example, if command queue 105 is representative of the priority command queue, then memory controller 103 will first examine command queue 105 for an available read request before examining command queue 107 and may thereby give priority to requests present in command queue 105.

In some examples, each memory bank of memory block 109 is representative of an addressable single-port SRAM bank that only accepts one access every other clock cycle, meaning that, after an execution, the SRAM banks of memory block 109 will enter a cool-down state before allowing a next execution. For example, if memory bank 7 allows an access in a first clock cycle, then memory bank 7 will stand unavailable until the third clock cycle, as memory bank 7 will be in a cool-down state during the second clock cycle.

In an implementation, the addresses of the SRAM banks are hashed to avoid problematic offsets which are detrimental to the performance of the computing environment 100. For example, in the context of neural networks, when executing read requests it is common to have access patterns with large strides which repetitively return to the same subset of addresses. Due to the every-other-access cycle of the employed SRAM banks, strides in which the subset of addresses map to the same SRAM bank perform very poorly. In some cases, such access patterns lead to a performance overhead of up to 300%. When the addresses are distributed among the SRAM banks, (e.g., by hashing or other address allocation), such access patterns are avoided. A method of hashing the addresses of the memory banks is discussed in detail with respect to FIG. 7. In some examples, the addresses of the SRAM banks are hashed statically prior to live read/write operations.

Figure 2:
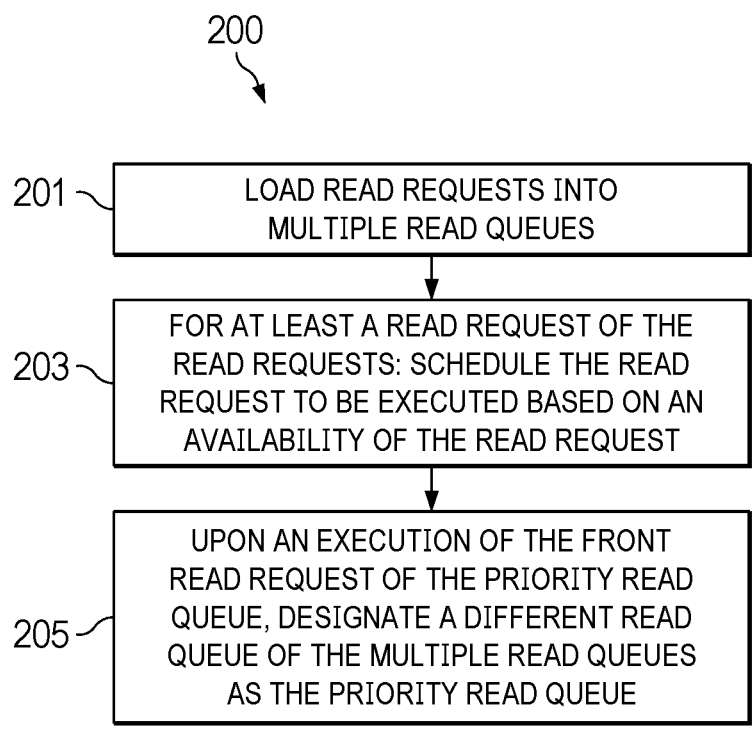
FIG. 2 illustrates a method of operating a memory controller in an implementation.

FIG. 2 illustrates a method of operating a memory controller that comprises multiple read queues (i.e., memory controller 103), herein referred to as method 200. To begin, the method includes loading read requests into the multiple read queues (step 201), such that one of the multiple read queues is currently designated as the priority read queue. Read requests may be generated by a processor associated with the memory controller (i.e., any of CPUs 101). In an implementation, the associated processor comprises streaming engines that are configured to provide read requests to a respective read queue. For example, in the context of FIG. 1, a first streaming engine of CPUs 101 provides read requests to command queue 105 while a second streaming engine provides read requests to command queue 107.

Next, for at least a read request of the read requests, the memory controller schedules the read request to be executed based on availability of the read request (step 203). In some examples, for the read request to be considered available within the priority read queue, the associated memory bank must also be available. Alternatively, for the read request to be available within a non-priority read queue, the memory controller may require the associated memory bank to be available and require the read request of the non-priority read queue to not conflict with a recently scheduled read request of the priority read queue. In operation, the memory controller sequentially scans the read requests of the priority read queue to determine the first read request that is available for execution. Next the memory controller sequentially scans the read requests of the non-priority read queue to identify a second read request that is available for execution. Upon identifying an available read request from the priority and non-priority read queues, the memory controller schedules the available requests for execution. In an implementation the memory controller executes the requests concurrently. In another implementation, the memory controller executes the read request of the priority read queue prior to executing the read request of the non-priority read queue. In the context of FIG. 1, memory controller 103 first scans the read requests of the priority read queue (e.g., command queue 105) to determine the first read request that is available for execution. Memory controller 103 then scans the read requests of the non-priority command queue (e.g., command queue 107) to determine a second read request that is available for execution. Upon identifying available requests from each queue, memory controller 103 schedules and executes the requests.

If the read request that is scheduled and executed from the priority read queue is the first read request in the queue (i.e., the front read request), the method continues with designating a different read queue of the multiple read queues as the priority read queue (step 205). In an implementation, the memory controller comprises a priority pointer, configured to determine the priority designation among the multiple read queues. The priority pointer reassigns the priority designation when the front read request of the priority read queue has been executed. In an implementation, the priority pointer reassigns the priority designation based on a capacity of read requests within the remaining read queues. For example, the priority pointer may reassign priority to the read queue which contained the most read requests. In another implementation, the priority pointer reassigns the priority designation to the read queue which has stored its front read request for the longest amount of time. In the context of FIG. 1, the priority circuitry of memory controller 103, assigns priority to the non-priority command queue (e.g., command queue 107) when the front read request of priority command queue (e.g., command queue 105) has been executed. The priority circuitry returns the priority designation when the front read request of new priority command queue has been executed.

Figure 3:
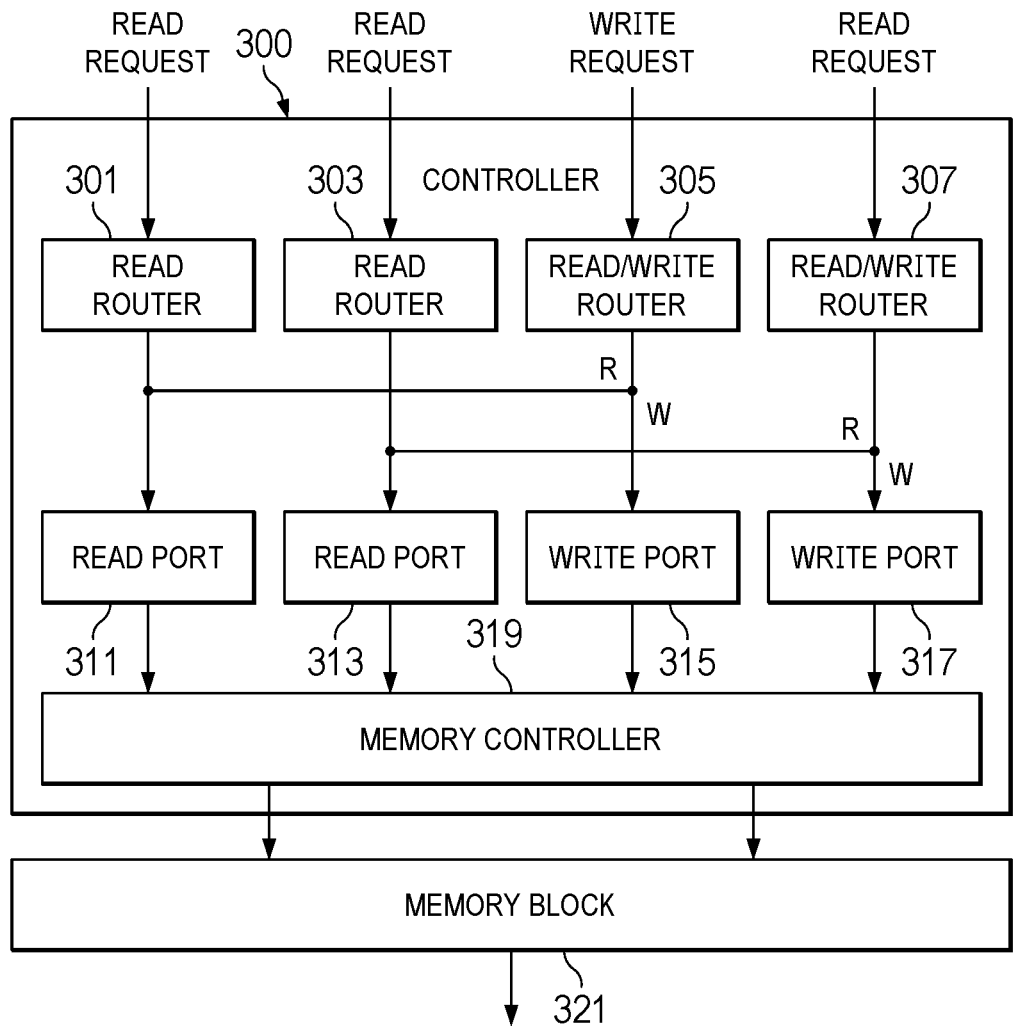
FIG. 3 illustrates a memory controller in an implementation.

FIG. 3 illustrates controller 300 in an implementation. Controller 300 includes, but is not limited to, memory controller 319 (i.e., memory controller 103), memory block 321 (i.e., memory block 109), and an arbitration network. Controller 300 may be coupled to one or more processors that send access requests in support of a software application to controller 300. Examples of the software application(s) running on the processors include, but are not limited to, artificial neural networks and other such machine learning algorithms (although any type of software may execute on the processors and may benefit from the memory techniques disclosed herein). Controller 300 executes the requests and returns data back to the associated processor. The data may be, for example, program code to be executed by the processors and/or actual data to be processed.

The arbitration network of controller 300 is configured to receive requests from the associated processor and route the requests accordingly. The arbitration network of controller 300 includes read routers 301 and 303, routers 305 and 307, read ports 311 and 315, and write ports 315 and 317. The routers of the arbitration network receive requests from an associated processor and accordingly route the requests to a specific read or write port. In an implementation, each router of the arbitration network corresponds to a requestor of the associated processor. Meaning, controller 300 comprises a router for each requestor of the associated processor. It should be noted that the arbitration network reduces the number of global wires required by controller 300 as the processor no longer needs direct access to each bank of memory block 321. Instead, each requestor of the associated processor provides service requests to the corresponding router to gain access to the data of memory block 321.

Read routers 301 and 303 are representative of components which only manage read requests. In an implementation, read routers 301 and 303 receive read requests from respective streaming engines of the associated processor. For example, a first streaming engine may deliver read requests to read router 301, while a second streaming engine delivers read requests to read router 303. In response, read router 301 routes the read requests to read port 311 and read router 303 routes the read requests to read port 313.

Routers 305 and 307 are representative of components which manage both read and write requests. In an implementation, routers 305 and 307 receive requests from respective components of the associated processor. For example, a data memory controller (DMC) of the associated processor may deliver requests to router 305, while an extended level-2 cache (EL2) delivers requests to router 307. In response, router 305 routes requests to either read port 311 or write port 315, depending on the type of request. Similarly, router 307 routes requests to either read port 313 or write port 317.

Read ports 311 and 313 are representative of components configured to load read requests to respective command queues of memory controller 319. In an implementation, memory controller 319 comprises a command queue for each read port of controller 300. In operation, read port 311 and read port 313 load read requests to the respective command queues of memory controller 319.

Write ports 315 and 317 are representative of components configured to load write requests to respective command queues of memory controller 319. In an implementation, memory controller 319 comprises a command queue for each write port of controller 300. In operation, write port 315 and write port 317 load write requests to the respective command queues of memory controller 319.

Memory controller 319 is representative of a controller configured to execute service requests. Memory controller 319 comprises a command queue for each read and write port of controller 300. The command queues of memory controller 319 store requests of a specific router. For example, a first command queue, coupled to read port 311, stores read requests from read router 301 and router 305. Similarly, a second command queue, coupled to read port 313, stores read requests from read router 303 and router 307. Alternatively, a third and fourth command queue, coupled to write ports 315 and 317 respectively, store write requests from the corresponding router. In an implementation, memory controller 319 is representative of the memory controllers illustrated in FIGS. 1, 4A-4C, 5A-5B, and 6.

Memory block 321, which is external to memory controller 319, represents a memory element that comprises multiple memory banks. In an implementation, each memory bank of memory block 321 is representative of an addressable single-port SRAM bank that only accepts one access every other clock cycle. Prior to operation, the addresses of the SRAM banks are hashed to avoid problematic offsets (later discussed in reference to FIG. 7). In an implementation, memory block 321 is representative of memory block 109 of FIG. 1.

In operation, the associated processors begin generating read and write requests for the routers of controller 300. Read requests received by read router 301 or router 305 are sent to read port 311. Alternatively read requests received by read router 303 or router 307 are sent to read port 313. Write requests received by router 305 are sent to write port 315, while write requests received by router 307 are sent to write port 317.

Figure 4A:
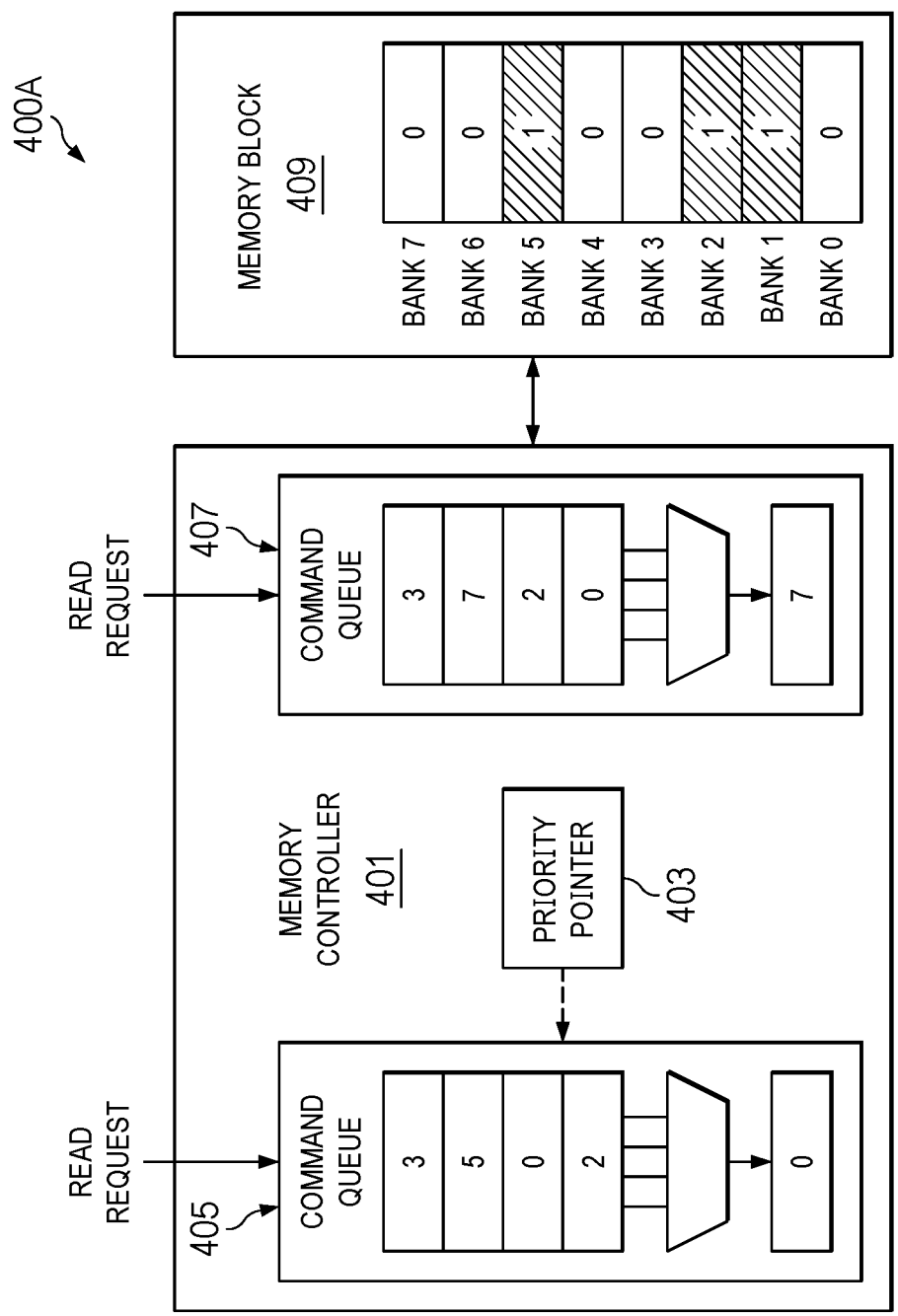
FIGS. 4A-4C illustrate an operational sequence in an implementation.
Figure 4B:
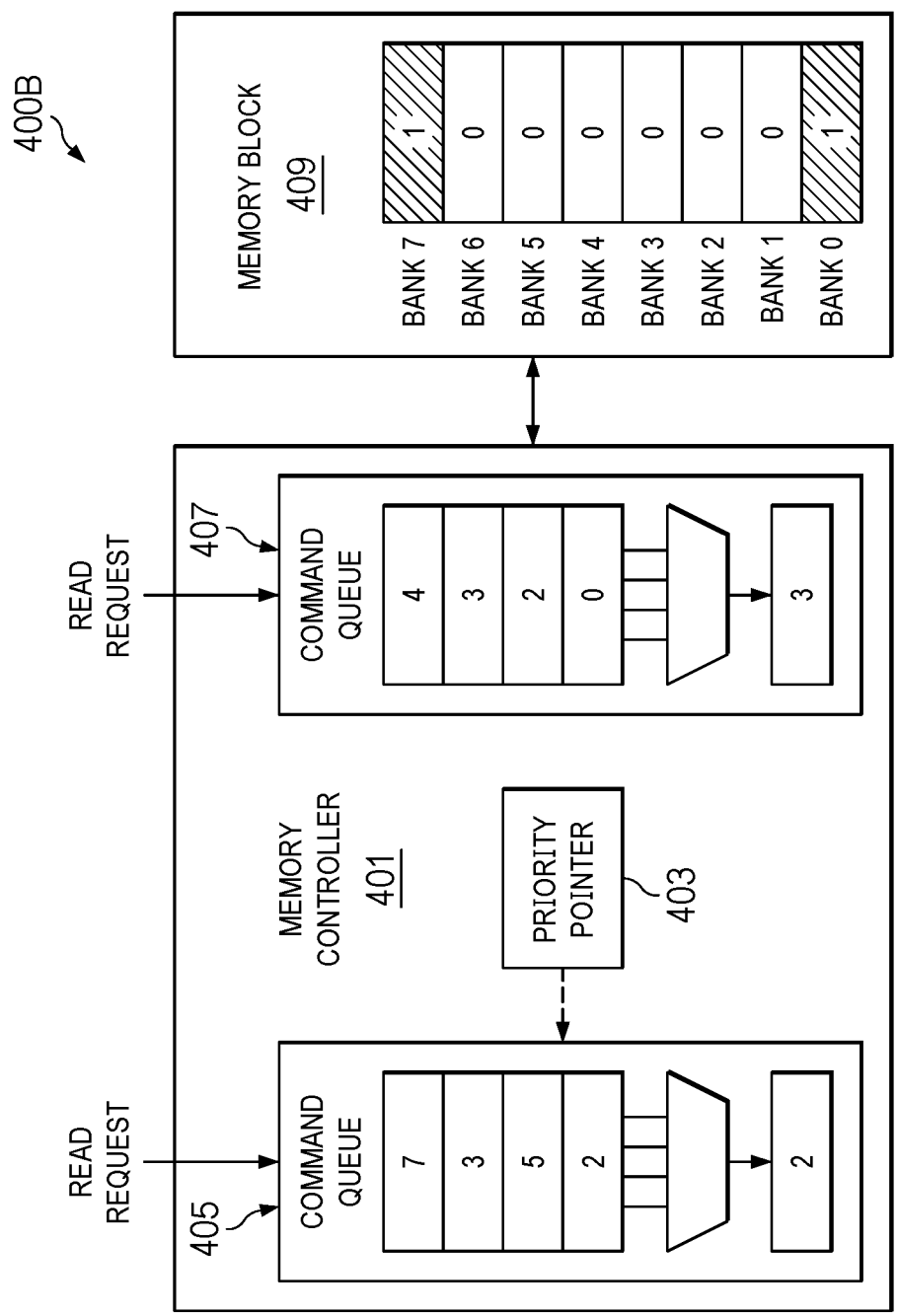
Figure 4C:
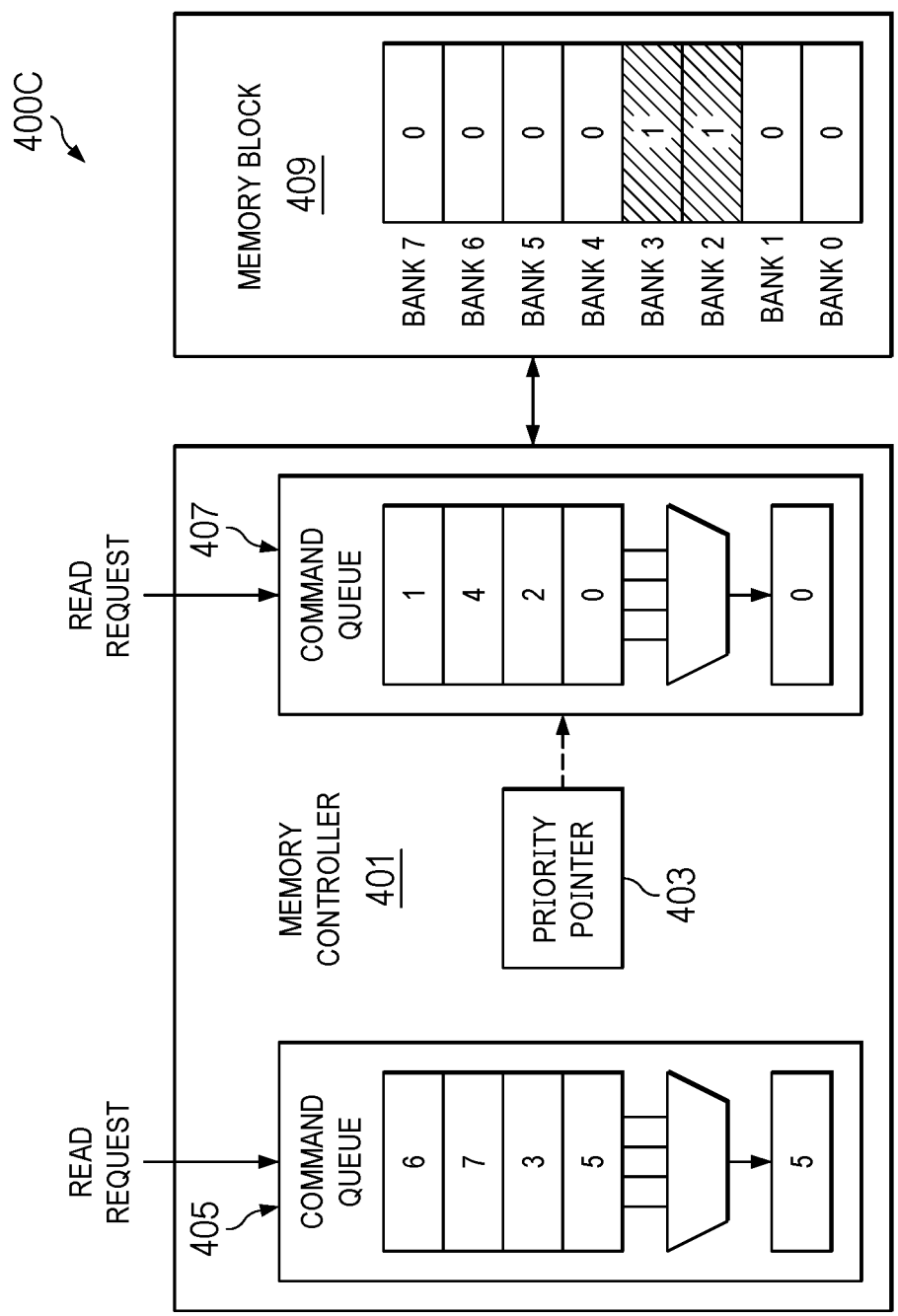
Figure 5A:
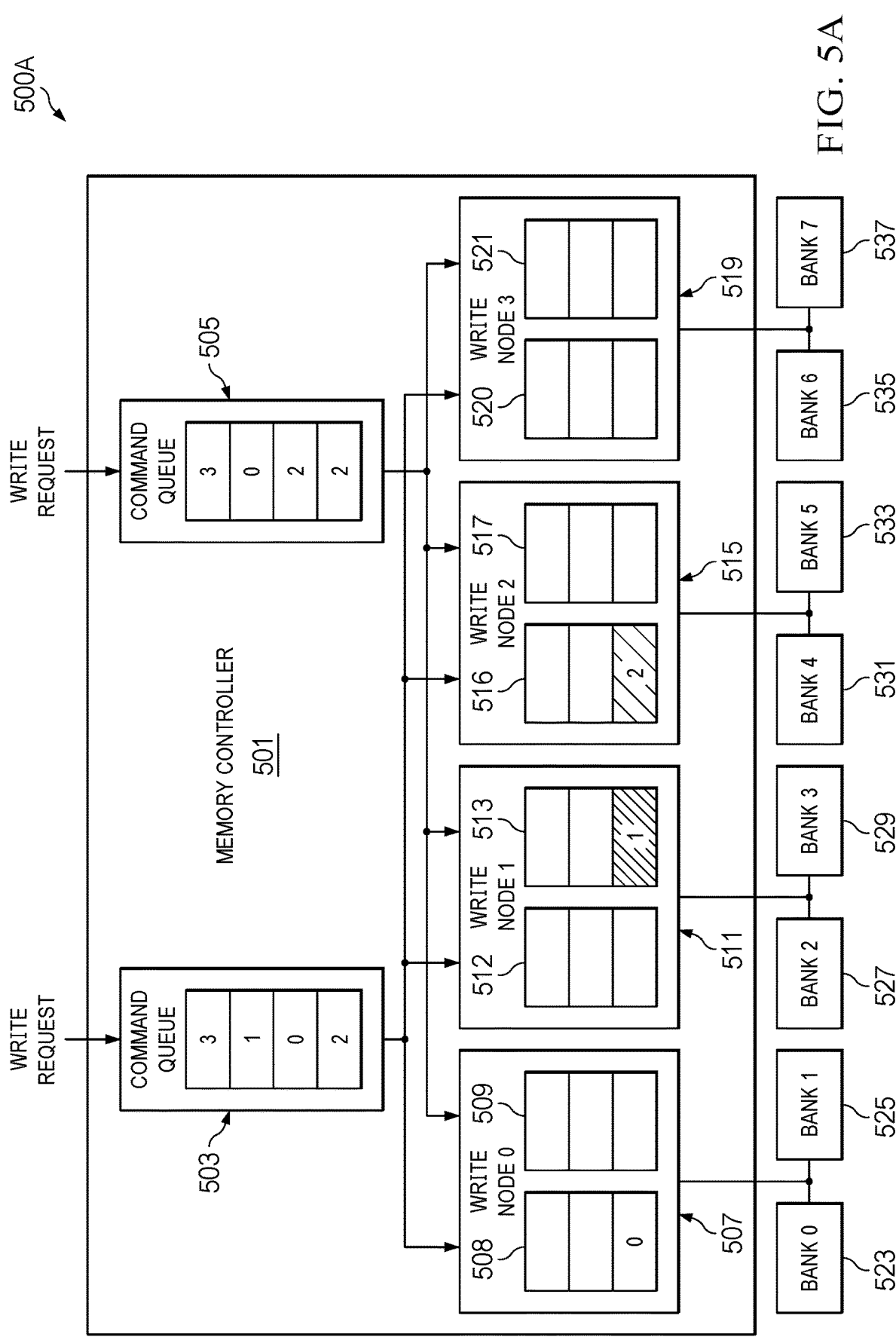
FIGS. 5A-5B illustrate an operational sequence in an implementation.
Figure 5B:
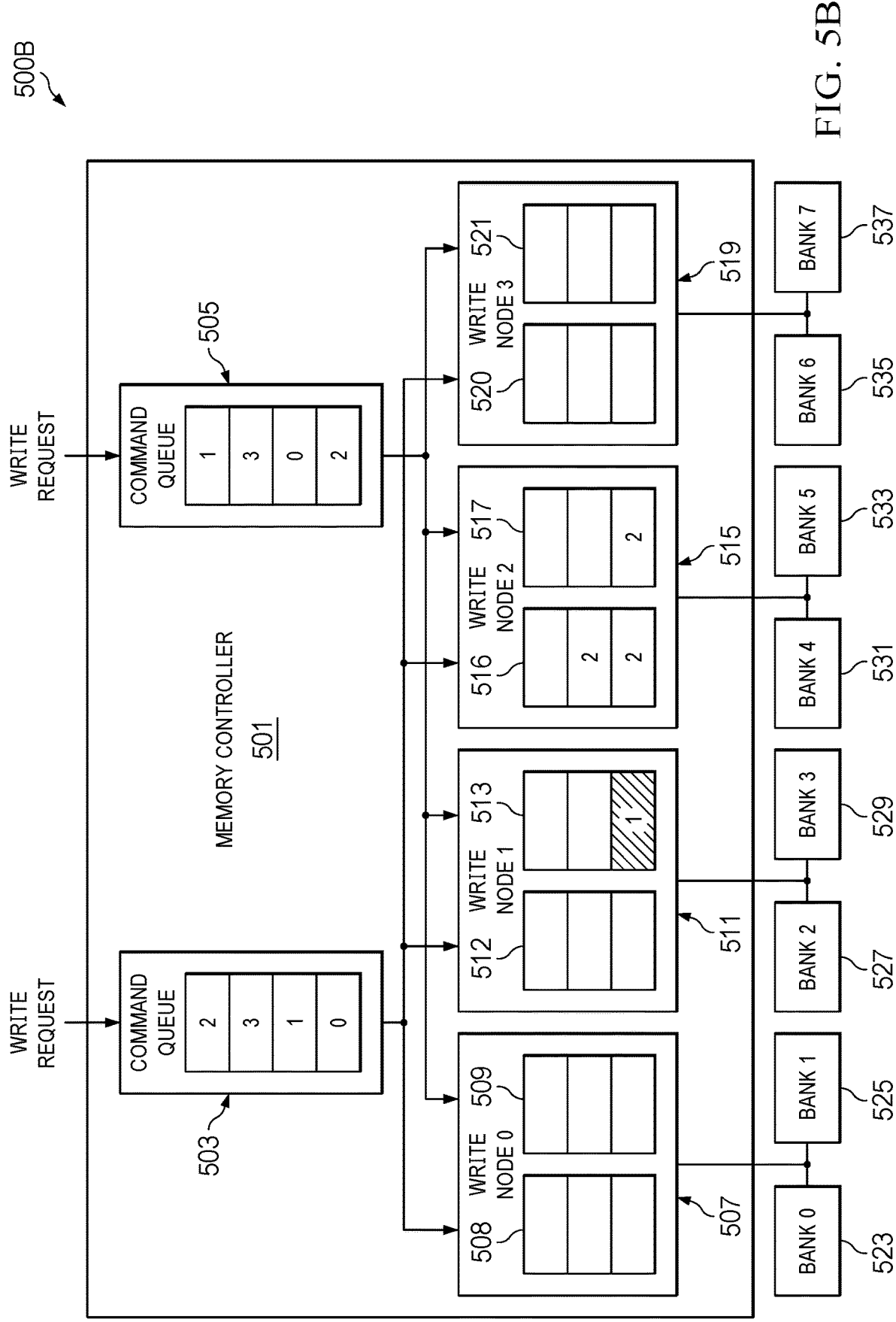

Upon receiving the requests, each port of controller 300 provides the requests to a corresponding command queue. In response, memory controller 319 begins executing the requests of the command queues. In an implementation, memory controller 319 employs method 200 to process the read requests, as depicted in FIGS. 4A-4C. In another implementation, memory controller 319 employs the operational sequence as depicted in FIGS. 5A-5B to process the write requests. If required by the request, memory controller 319 will return data of the request back to the associated processor.

FIGS. 4A-4C illustrate an operational sequence for a memory controller configured to handle read requests, herein referred to as memory controller 401. Memory controller 401 may be implemented in a larger context to serve as an on-chip mechanism for handling read requests. For example, memory controller 401 may be representative of memory controller 319 of controller 300. In such context, memory controller 401 receives read requests from read port 311 and read port 313. Memory controller 401 is coupled to memory block 409 and includes, but is not limited to, priority pointer 403, command queue 405, and command queue 407. In other implementations memory controller 401 comprises more than two command queues, but for the purposes of explanation, only two command queues will be discussed herein.

Priority pointer 403 may be representative of hardware, software, firmware, or a combination thereof, configured to assign priority among the command queues of memory controller 401. The priority designation assigned by priority pointer 403 provides an indication as to which command queue memory controller 401 should service first. In operation, priority pointer 403 reassigns the priority designation when the front read request of the priority command queue has been executed. For example, priority pointer 403 will reassign priority from command queue 405 to command queue 407 when the front read request of command queue 405 has been executed.

Command queue 405 and command queue 407 are representative of queues configured to store read requests. Command queues 405 and 407 may indirectly receive read requests from a processor associated with memory controller 401. For example, a first streaming engine of the associated processor may supply the read requests for command queue 405 while a second streaming engine of the associated processor supplies read requests for command queue 407. In the context of FIG. 3, command queue 405 may receive read requests from read port 311 while command queue 407 receives read requests from read port 313. In an implementation, memory controller 401 comprises a command queue for each read requestor (i.e., streaming engine) of the associated processor.

In an implementation, the read requests of command queues 405 and 407 specify the desired memory bank for executing the read request. For example, the currently scheduled read request of command queue 405 attempts to access memory bank 0, while the currently scheduled read request of command queue 407 attempts to access memory bank 7. Memory controller 401 determines which read request to schedule based on the availability of the associated memory bank and the current priority designation.

Memory block 409 is representative of a memory element that comprises multiple memory banks arranged in parallel (e.g., memory block 109). In an implementation, each memory bank of memory block 409 is representative of an addressable single-port SRAM bank that only accepts one access every other clock cycle. Meaning, after an execution, the SRAM banks of memory block 409 require a cool-down cycle to allow a next execution. Memory banks 1, 2, and 5 are representative of SRAM banks that were accessed in a previous cycle and thus require a cool-down period before allowing a next execution. Alternatively, the remaining banks of memory block 409 (i.e., memory banks 0, 3, 4, 6, and 7) stand available. In an implementation, the addresses of the SRAM banks are hashed to avoid problematic offsets which are detrimental to the performance of memory controller 401, later discussed with reference to FIG. 7.

Now turning to FIG. 4A, stage 400A depicts the first execution of read requests. To begin, memory controller 401 first identifies the current priority designation as indicated by priority pointer 403. Next, memory controller 401 begins scanning the priority command queue (i.e., command queue 405) to determine the first read request that is available for execution. Meaning, memory controller 401 identifies the first read request in that queue that has an available memory bank. Starting at the front of command queue 405, memory controller 401 examines the availability of memory bank 2. As memory bank 2 is in a cool-down state, memory controller 401 moves to the next read request in command queue 405 and examines the availability of the corresponding memory bank. As memory bank 0 is available for access, memory controller 401 schedules the corresponding read request. It should be noted that because the scheduled read request was not at the front of the queue, command queue 405 maintains the priority designation.

Upon scheduling the read request for command queue 405, memory controller 401 begins scanning command queue 407 to determine the first read request from that queue that is available for execution. Meaning, memory controller 401 identifies the first read request that has an available memory bank and further does not interfere with the recently scheduled read request of the priority command queue. Starting at the front of command queue 407, memory controller 401 examines the availability of the front read request. As the front read request conflicts with the recently scheduled read request of command queue 405, memory controller 401 moves to the next read request in command queue 407 and examines the availability of the next read request. As memory bank 2 is in a cool-down state, memory controller 401 moves to the next read request in command queue 407 and examines the availability. As memory bank 7 is available for access, and the corresponding read request does not conflict with the recently scheduled read request of command queue 405, memory controller 401 schedules the read request. As a result, memory controller 401 executes the scheduled read requests and returns the results to the respective requestor. In an implementation memory controller 401 executes the requests concurrently. In another implementation memory controller 401 executes the read request of the priority read queue prior to executing the request of the non-priority read queue.

Now turning to FIG. 4B, stage 400B depicts the next execution of memory controller 401, such that the next execution is subsequent to the execution depicted in stage 400A. As a result of stage 400A, command queues 405 and 407 receive new read requests to be stored. Further, memory block 409 now depicts memory banks 1, 2, and 5 as available and memory banks 0 and 7 in a cool-down state.

Upon completion of stage 400A, memory controller 401 reexamines the priority designation of the command queues. As the priority designation did not change from what was shown in stage 400A, memory controller 401 begins scanning command queue 405 to determine the first read request in that queue that is available for execution. Starting at the front of command queue 405, memory controller 401 examines the availability of memory bank 2. As memory bank 2 now stands available for access, memory controller 401 schedules the corresponding read request.

Upon scheduling the front read request of command queue 405, memory controller 401 begins scanning command queue 407 to determine the first read request in that queue that is available for execution. Starting at the front of command queue 407, memory controller 401 examines the availability of the front read request. As memory bank 0 is in a cool-down state, memory controller 401 moves to the next read request in command queue 407 and examines the availability of the request. As the next read request conflicts with the recently scheduled read request of command queue 405, memory controller 401 moves to the next read request in command queue 407 and examines its availability. As memory bank 3 is available for access, and the corresponding read request does not conflict with the recently scheduled read request of command queue 405, memory controller 401 schedules the read request. As a result, memory controller 401 executes the scheduled read requests and returns the results to the respective requestor. Further priority pointer 403 switches the priority designation to command queue 407, as the front read request of command queue 405 has been executed.

Now turning to FIG. 4C, stage 400C depicts the next execution of memory controller 401, such that the next execution is subsequent to the execution depicted in stage 400B. As a result of stage 400B, command queues 405 and 407 receive new read requests and memory block 409 depicts memory banks 0 and 7 as available and memory banks 2 and 3 in a cool-down state.

To begin, memory controller 401 identifies the current priority designation as indicated by priority pointer 403. Upon completion of stage 400B, priority pointer 403 transitions the priority designation from command queue 405 to command queue 407. As a result, when determining the first read request from that queue that is available for execution, memory controller 401 identifies the first read request of command queue 407 that has an available memory bank. Starting at the front of command queue 407, memory controller 401 examines the availability of memory bank 0. As memory bank 0 now stands available for access, memory controller 401 schedules the corresponding read request.

Upon scheduling the front read request of command queue 407, memory controller 401 begins scanning command queue 405 to determine the first read request that is available for execution from the command queue 405. As command queue 405 no longer holds the priority designation, when determining the first read request that is available for execution, memory controller 401 identifies the first read request of command queue 405 that has an available memory bank and does not interfere with the recently scheduled read request of the priority command queue (i.e., command queue 407).

Starting at the front of command queue 405, memory controller 401 examines the availability of the front read request. As memory bank 5 is available for access, and the corresponding read request does not conflict with the recently scheduled read request of command queue 407, memory controller 401 schedules the read request. As a result, memory controller 401 executes the scheduled read requests and returns the results to the respective requestor. Further priority pointer 403 switches the priority designation back to command queue 405, as the front read request of command queue 407 has been executed. It should be noted that the priority designation only changes when the front read request of the priority command queue is executed. Meaning, executions of front read requests from non-priority command queues do not affect the priority designation.

FIGS. 5A and 5B illustrate an operational sequence for a memory controller configured to handle write requests, herein referred to as memory controller 501. Memory controller 501 may be implemented in a larger context to serve as an on-chip mechanism for handling write requests. For example, memory controller 501 may be representative of memory controller 319 of controller 300. In such context, memory controller 501 receives write requests from write port 315 and write port 317. While only two write ports are shown (315 and 317), it may be appreciated that more than two write ports are possible. In an implementation memory controller 501 is further configured to handle read requests. For example, memory controller 501 may be representative of memory controller 103 or memory controller 401, such that the elements for handling read requests are not shown.

Memory controller 501 includes, but is not limited to, command queue 503, command queue 505, and write nodes 507, 511, 515, and 519. While only two command queues are shown (503 and 505), it may be appreciated that more than two command queues are possible. For example, memory controller 501 may comprise a command queue for each write port of the associated device.

Command queue 503 and command queue 505 are representative of queues configured to store write requests. In operation, command queues 503 and 505 store write requests in the order in which the write requests were received. Command queues 503 and 505 may indirectly receive write requests from a processor associated with memory controller 501. For example, a DMC of the associated processor may supply the write requests for command queue 503 while an EL2 of the associated processor supplies write requests for command queue 505. In an implementation, command queues 503 and 505 receive write requests from respective ports (i.e., write port 315 and write port 317) of an associated device (controller 300). Command queues 503 and 505 provide write requests to write nodes 507, 511, 515, and 519. It should be noted that the write requests stored by command queues 503 and 505 specify the desired write node for executing the request.

Write node 507 is representative of "write node 0" and is coupled to memory bank 523 and memory bank 525. Write node 511 is representative of "write node 1" and is coupled to memory bank 527 and memory bank 529. Write node 515 is representative of "write node 2" and is coupled to memory bank 531 and memory bank 533. Write node 519 is representative of "write node 3" and is coupled to memory bank 535 and memory bank 537.

In an implementation each node of write nodes 507, 511, 515, and 519 comprise a queue for each command queue of memory controller 501. In operation, command queues 503 and 505 provide write requests to the corresponding queue of the appropriate write node. The appropriate write node describes the write node which is coupled to the correct memory bank for performing the write request. For example, if command queue 503 stores a write request for memory bank 527, then command queue 503 will provide the write request to queue 512 of write node 511. Alternatively, if command queue 505 stores a write request for memory bank 527, then command queue 505 will provide the write request to queue 513 of write node 511. More specifically, command queue 503 may provide write requests to queue 508 of write node 507, queue 512 of write node 511, queue 516 of write node 515, or queue 520 of write node 519, dependent on the requirements of the write request. Alternatively, command queue 505 may provide write requests to queue 509 of write node 507, queue 513 of write node 511, queue 517 of write node 515, or queue 521 of write node 519. It should be noted that there are more write nodes than there are command queues to allow multiple write transactions, from the same command queue, to be executed concurrently.

In an implementation, memory banks 523, 525, 527, 529, 531, 533, 535, and 537 are representative of addressable single-port SRAM banks which only accept one access every other clock cycle. Meaning, memory banks 523, 525, 527, 529, 531, 533, 535, and 537 require a cool-down cycle before allowing a next execution. Prior to operation, the addresses of the memory banks are hashed to avoid problematic offsets, later described in FIG. 7.

Now turning to FIG. 5A, stage 500A depicts a first execution of write requests. To begin, command queues 503 and 505 receive write requests from an associated device. Next, memory controller 501 dequeues the front write requests of command queues 503 and 505 to the corresponding queue of the appropriate write node. In response, memory controller 501 determines the availability of the write requests stored by the queues of the write nodes. Write requests may only be executed when the corresponding memory bank is available. Memory banks which are not available may be servicing a different request or cooling down for a next execution.

In an implementation, memory controller 501 services both read and write requests. In some examples, by default, the read requests take priority over the write requests. Meaning, when a read request and a write request require access to the same memory bank, memory controller 501 will execute the read request, prior to executing the write request. As such, write requests may not be executed when the associated memory bank is servicing a read request. In an implementation, memory controller 501 prioritizes the write requests over the read requests (directed towards the same memory bank) when a queue of a write node is full. Meaning, memory controller 501 will execute the write requests of the full queue, before executing any read request which requires access to the same memory bank as the write requests within the full queue. Read requests gain priority over the write requests once the queue is no longer full.

Upon examining the write nodes, memory controller 501 determines the following. First, the write request of queue 508 of write node 507 is available for execution. Next, the write request of queue 513 of write node 511 is unavailable for execution because the corresponding memory bank is currently servicing a different request (i.e., read request). Last, the write request of queue 516 of write node 515 is unavailable for execution because the corresponding memory bank is in a cool-down state. As a result, memory controller 501 executes the write request of queue 508. Upon executing the request, command queues 503 and 505 receive new write requests from the associated device, and memory controller 501 dequeues the front write requests of command queues 503 and 505 to the corresponding queue of the appropriate node.

Now turning to FIG. 5B, stage 500B depicts the next execution of memory controller 501. Upon completion of stage 500A, memory controller 501 determines the availability of the write requests stored by the queues of the write nodes. Upon examining the write nodes, memory controller 501 determines the write request of queue 513 of write node 511 is unavailable for execution because the corresponding memory bank is in a cool-down state. Further memory controller 501 determines, the write requests of queue 516 and queue 517 of write node 511 are available for execution.

In an implementation, to determine which write request to execute from the available options, memory controller 501 examines the current capacity of the queues. For example, as queue 516 contains more write requests than queue 517, memory controller 501 will execute a command from queue 516. In another implementation, memory controller 501 examines the urgency of the requests to determine which write request to execute from the available options.

Upon determining which request to execute, memory controller 501 executes one of the available options. As a result, command queues 503 and 505 receive new write requests and memory controller 501 provides the front write requests of command queues 503 and 505 to the appropriate queue of the respective node. The operational sequence depicted in stage 500A and stage 500B is repeated for the remaining write request executions.

Figure 6:
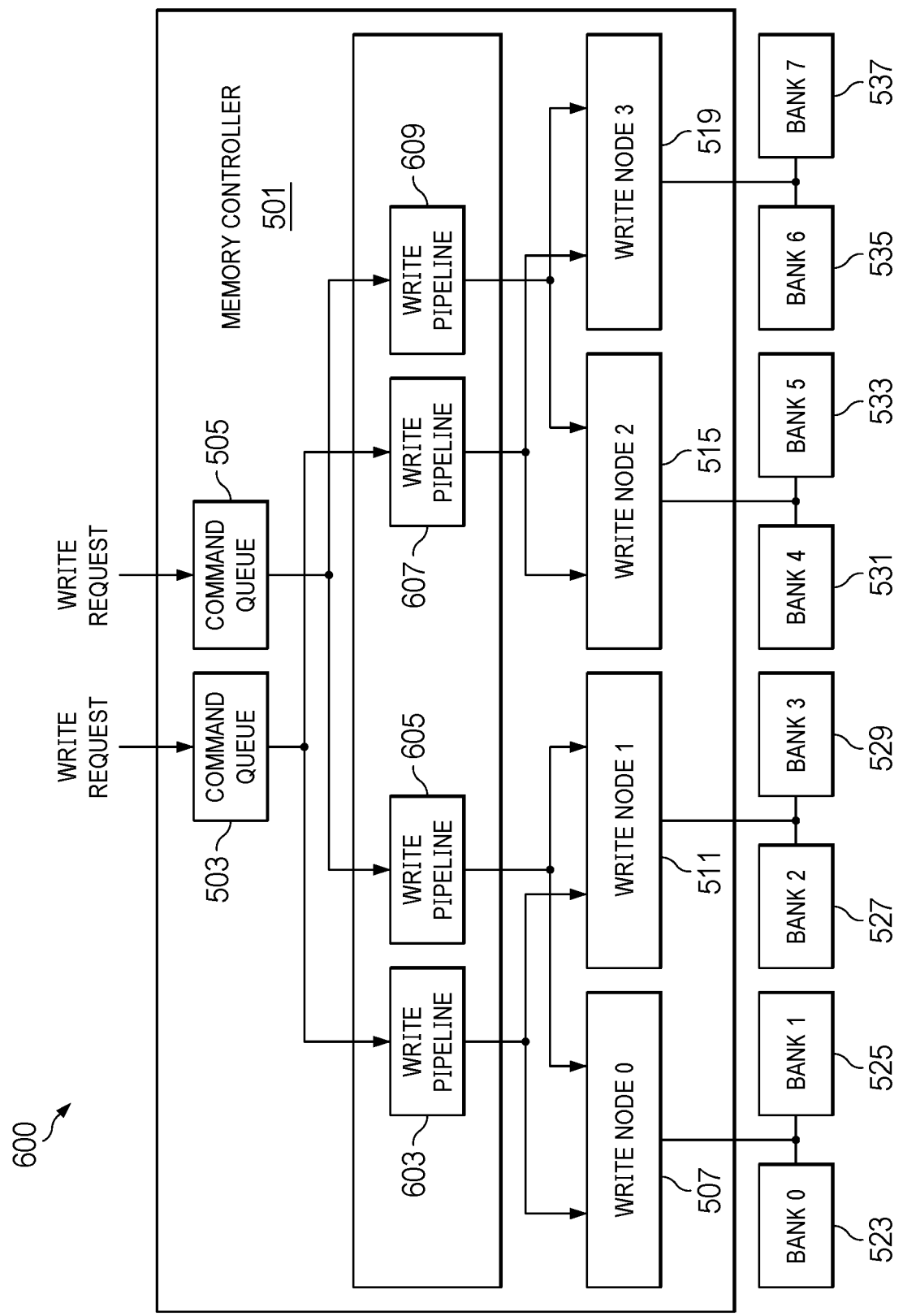
FIG. 6 illustrates a memory controller in an implementation.

FIG. 6 illustrates another architecture for memory controller 501 of FIGS. 5A and 5B, herein referred to as architecture 600. Architecture 600 includes a write request pipelining network. The write pipelining network of architecture 600 is inserted between the command queues and the write nodes of memory controller 501 and is configured to route write requests from the command queues to the corresponding queue of the appropriate write node. The write pipelining network of memory controller 501 includes pipeline 603, pipeline 605, pipeline 607, and pipeline 609. In an implementation, the write request pipelining network includes a pipeline for each write node of the memory controller.

Pipeline 603 is representative of a network configured to load write requests from command queue 503 to the corresponding queues of write nodes 507 and 511. Pipeline 603 may load write requests to either queue 508 (not shown) of write node 507 or queue 512 (not shown) of write node 511, dependent on the requirements of the write request. To determine which write node to provide the request to, pipeline 603 examines the memory bank requirements of the write request.

Pipeline 605 is representative of a network configured to load write requests from command queue 505 to the corresponding queues of write nodes 507 and 511. Pipeline 605 may provide write requests to either queue 509 (not shown) of write node 507 or queue 513 (not shown) of write node 511. When providing the requests, pipeline 605 examines the memory bank requirements of the write request to determine which write node to provide the request to.

Pipeline 607 is representative of a network configured to load write requests from command queue 503 to the corresponding queues of write nodes 515 and 519. Pipeline 607 may provide write requests to either queue 516 (not shown) of write node 515 or queue 520 (not shown) of write node 519. Pipeline 607 examines the memory bank requirements of the write request to determine which write node to provide the request to.

Pipeline 609 is representative of a network configured to load write requests from command queue 505 to the corresponding queues of write nodes 515 and 519. Pipeline 607 may provide write requests to either queue 517 (not shown) of write node 515 or queue 521 (not shown) of write node 519. To determine which write node to provide the request to, pipeline 609 examines the memory bank requirements of the write request.

Figure 7:
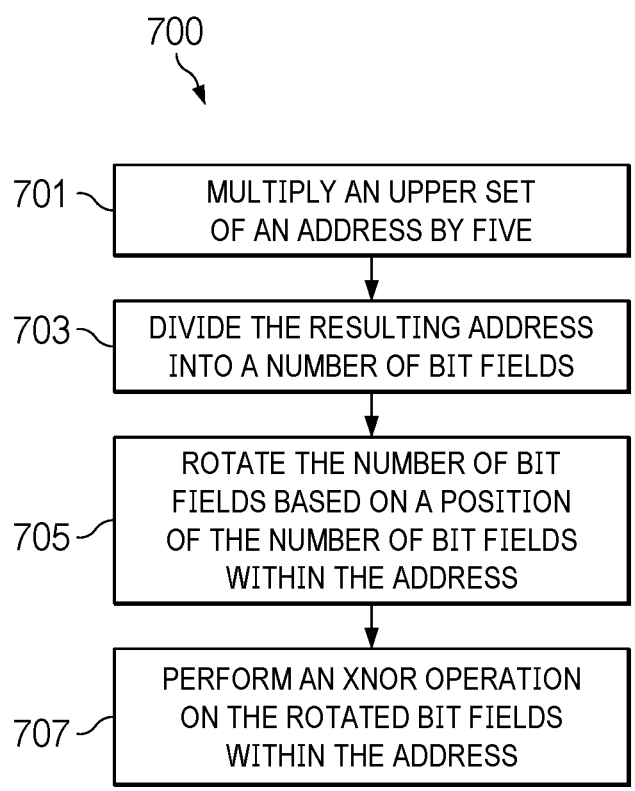
FIG. 7 illustrates a hashing process in an implementation.

FIG. 7 illustrates a hashing process 700 for a memory controller (i.e., memory controller 103). Hashing process 700 is representative of a method for identifying an associated memory bank (i.e., memory banks of memory block 109) that is the subject of a read request or write request.

More generally, a memory controller as contemplated herein may operate in accordance with one of two modes to identify an associated memory bank: one in which a portion of an address identified in a request is used directly to ascertain the identity of the memory bank, or another where a hashing algorithm is applied to the address to determine which bank the address maps to. Hashing process 700 describes the latter: an algorithm for hashing an address identified in a read or write address to determine its associated memory bank.

A suitable hashing algorithm is used on write requests when the benefits of the write processes described herein are desired (such as to avoid systemic bank conflicts). A suitable hashing algorithm is used on read requests when the data being sought was written using the hashing algorithm. In other words, if the write request that wrote the data to its present location in memory was subject to the hashing algorithm, then a read request seeking the same data would be subject to the same hashing algorithm. The following describes the steps performed by a memory controller when subject to hashing process 700.

In operation, a memory controller receives a service request that identifies an address in memory. As discussed above, the availability of the memory bank associated with the service request influences whether the request will be scheduled. To identity the associated memory bank, the memory controller begins by multiplying an upper set of the address by five (step 701) such that the upper set of the address describes the bits of the address that are greater than the bits that describe the byte offset within the bank. For example, if the memory banks are 16 bytes wide, then each bit of the address which is greater than four will be multiplied by five. In an implementation, the upper set of bits undergo a shift operation and an addition-operation to acquire the desired results.

Next, the memory controller divides the resulting address into a discrete number of bit fields (step 703). In an implementation the number of bit fields is equal to the number of bits within the address after the multiplication operation, divided by a binary logarithm of the number of memory banks within the system. For example, upon completion of step 701, if an address now has 12 bits within a system having 8 memory banks, then the number of bit fields will be equal to 12 divided by the binary logarithm of 8.

Upon dividing the address, the memory controller rotates the number of bit fields of the address based on a position of the number of bit fields within the address (step 705). As a result, the address now contains a discrete number of rotated bit fields. Last, the memory controller performs an exclusive-nor (XNOR) operation on the number of rotated bit fields within the address (step 707). As a result of the XNOR operation, the memory controller possesses the identity of the memory bank associated with the service request and can proceed to determine its availability.

Alternative hashing processes are possible. For example, a memory controller could XOR all the address bits by dividing the address into N-bit fields and XORing the fields together to produce a final bank number (where N is the number of bits required to encode the bank number). For example, for a 16-bank memory system with 16 byte-wide banks, N=4, and the function effectively XORs all the nibbles of the address together except for the lowest nibble, which encodes the byte address within the bank. With this technique, any sequences of addresses that stride by a power of 2 are guaranteed to go to different banks in subsequent cycles. For example, this would occur for a 4 MB (22 address bits), 16 bank system with stride by 0x400 (1 KB). However, a disadvantage of such an alternative hashing function is that if one has a stride that has the same number in two of the N-bit fields, then the bank address that is generated will periodically end up going to the same bank for 2^N cycles.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method comprising:
   storing a set of read requests into a set of read queues, wherein the set of read queues include a first read queue currently designated as a priority read queue;
   for a first read request of the set of read requests: determining whether to schedule the first read request based on an availability of an associated memory bank and, if the first read request is in a queue of the set of read queues that is not the priority read queue, also based on whether the first read request conflicts with a second read request from the priority read queue; and
   based on executing the second read request of the priority read queue, determining whether to designate a different read queue of the set of read queues as the priority read queue based on whether the second read request was at a front of the priority read queue.

2. The method of claim 1 further comprising, upon determining that the associated memory bank is available, and that the first read request is not in the priority read queue and does not conflict with the second read request, then scheduling the first read request to be executed.

3. The method of claim 1 further comprising, upon determining that the associated memory bank is available, and that the first read request is in the priority read queue, then scheduling the first read request to be executed.

4. The method of claim 1 wherein determining whether the associated memory bank is available is based on whether more than one cycle has occurred since a most recent access of the associated memory bank.

5. The method of claim 1 wherein the first read request conflicts with the second read request when the associated memory bank for the first read request is the same as a memory bank associated with the recently scheduled read request.

6. The method of claim 1 further comprising, if the associated memory bank is not available, refraining from scheduling the first read request and moving to a next read request in the queue, regardless of whether the queue is the priority read queue.

7. The method of claim 1 further comprising, upon scheduling the first read request to be executed, moving to a next read request in a different one of the set of read queues, regardless of whether the queue is the priority read queue.

8. The method of claim 1 further comprising:
   loading write requests into multiple write queues; and
   processing the write requests, including by: for each write request, dequeuing the write request to a write node coupled to an associated memory bank and scheduling the write request to be executed based on an availability of the associated memory bank.

9. The method of claim 8 wherein scheduling the write request to be executed based on the availability of the associated memory bank comprises:
upon determining that the associated memory bank is not available and the write node is not full, refraining from scheduling the write request and moving to a next write request in a different write node; and
upon determining that the associated memory bank is not available and the write node is full, prioritizing the write request over read requests directed to the associated memory bank; and
upon determining that the associated memory bank is available, scheduling the write request to be executed.

10. A memory controller comprising:
a set of read queues, wherein the set of read queues include a first read queue currently designated as a priority read queue; and
control circuitry coupled to the set of read queues configured to:
load read requests into the set of read queues;
for at least a read request of the read requests: schedule the read request to be executed based on an availability of an associated memory bank and, if the read request is in a queue that is not the priority read queue, also based on whether the read request conflicts with a recently scheduled read request from the priority read queue; and
upon an execution of the recently scheduled read request of the priority read queue, designate a different read queue of the set of read queues as the priority read queue if the recently scheduled read request was at a front of the priority read queue.

11. The memory controller of claim 10 wherein, upon a determination that the associated memory bank is available, and that the read request is not in the priority read queue and does not conflict with the recently scheduled read request, the control circuitry schedules the read request to be executed.

12. The memory controller of claim 10 wherein, upon a determination that the associated memory bank is available, and that the read request is in the priority read queue, then the control circuitry schedules the read request to be executed.

13. The memory controller of claim 10 wherein for the associated memory bank to be available, more than one cycle of requests must have occurred since a most recent access of the associated memory bank.

14. The memory controller of claim 10 wherein the read request conflicts with the recently scheduled read request when the associated memory bank for the read request is the same as a memory bank associated with the recently scheduled read request.

15. The memory controller of claim 10 further comprising, upon a determination that the associated memory bank is not available, the control circuitry refrains from scheduling the read request and moves to a next read request in the queue, regardless of whether the queue is the priority read queue.

16. The memory controller of claim 10 wherein, upon scheduling the read request to be executed, the control circuitry moves to a next read request in a different one of the set of read queues, regardless of whether the queue is the priority read queue.

17. A computing apparatus comprising:
a set of memory banks;
one or more processors coupled to the set of memory banks; and
a memory controller coupled to the set of memory banks and the one or more processors, wherein the memory controller comprises a set of read queues, and wherein the memory controller is configured to:
load read requests from the one or more processors into the set of read queues, wherein the set of read queues include a read queue currently designated as a priority read queue;
for at least a read request of the read requests: schedule the read request to be executed based on an availability of an associated memory bank and, if the read request is in a queue that is not the priority read queue, also based on whether the read request conflicts with a recently scheduled read request from the priority read queue; and
upon an execution of the recently scheduled read request of the priority read queue, designate a different read queue of the set of read queues as the priority read queue if the recently scheduled read request was at a front of the priority read queue.

18. The computing apparatus of claim 17 wherein the memory controller is configured to:
upon a determination that the associated memory bank is available, and that the read request is not in the priority read queue and does not conflict with the recently scheduled read request, then schedule the read request to be executed and move to a next request in the priority read queue;
upon a determination that the associated memory bank is available, and that the read request is in the priority read queue, then schedule the read request to be executed and move to a next request in a different one of the set of read queues; and
upon a determination that the associated memory bank is not available, refrain from scheduling the read request and move to a next read request in the queue, regardless of whether the queue is the priority read queue.

19. The computing apparatus of claim 17 wherein for the associated memory bank to be available, more than one cycle of requests must have occurred since a most recent access of the associated memory bank.

20. The computing apparatus of claim 17 wherein the read request conflicts with the recently scheduled read request when the associated memory bank for the read request is the same as a memory bank associated with the recently scheduled read request.

* * * * *